United States Patent [19]

Gilmer et al.

[11] Patent Number: 4,812,506

[45] Date of Patent: Mar. 14, 1989

[54] AMINO METHYL PROPANOL BLOCKED AROMATIC SULFONIC ACID

[75] Inventors: Thomas C. Gilmer, Media, Pa.; David C. K. Chang, Birmingham, Mich.

[73] Assignee: E. I Du Pont De Nemours and Company, Wilmington, Del.

[21] Appl. No.: 52,495

[22] Filed: May 15, 1987

[51] Int. Cl.$^4$ .............................................. C08L 61/00
[52] U.S. Cl. ..................................... 524/512; 502/167; 523/400; 524/507; 524/539; 524/365; 524/379; 525/161; 525/162; 525/163; 525/438; 525/440; 525/443; 428/436; 428/460; 428/461; 428/500
[58] Field of Search .................... 525/162, 161, 163; 524/512, 539; 502/167

[56] References Cited

U.S. PATENT DOCUMENTS

| | | | |
|---|---|---|---|
| 2,688,607 | 9/1954 | Suen | 260/67.6 |
| 3,095,396 | 6/1963 | Mantz | 260/29.4 |
| 3,231,410 | 1/1966 | Huber et al. | 117/75 |
| 3,329,720 | 7/1967 | Yamaguchi et al. | 260/584 |
| 3,477,976 | 11/1969 | Nakamuro et al. | 260/22 |
| 3,565,846 | 2/1971 | Enders et al. | 260/29.4 |
| 3,810,853 | 5/1974 | James et al. | 260/21 |
| 3,864,300 | 2/1975 | Robey | 260/29.4 UA |
| 3,893,963 | 7/1975 | Sausman | 260/29.4 R |
| 4,029,831 | 6/1977 | Dauheimer | 427/264 |
| 4,075,176 | 2/1978 | Gallacher | 260/67.6 R |
| 4,083,830 | 4/1978 | Gallacher | 260/67.6 R |
| 4,143,015 | 3/1979 | Soeterik | 260/29.4 UA |
| 4,182,702 | 1/1980 | Schwartz | 260/42.16 |
| 4,192,826 | 3/1980 | Beresniehicz et al. | 525/425 |
| 4,200,729 | 4/1980 | Calbo | 525/398 |
| 4,251,665 | 2/1981 | Calbo | 548/215 |
| 4,378,430 | 3/1983 | Modrovich | 435/12 |
| 4,403,003 | 9/1983 | Backhouse | 427/407.1 |
| 4,429,066 | 1/1984 | Gilmer | 524/158 |
| 4,539,363 | 9/1985 | Backhouse | 524/460 |

Primary Examiner—Theodore E. Pertilla
Attorney, Agent, or Firm—Hilmar L. Fricke

[57] ABSTRACT

A blocked acid catalyst of an aromatic sulfonic acid blocked with amino methyl propanol and coating compositions containing the blocked acid catalyst.

5 Claims, No Drawings

AMINO METHYL PROPANOL BLOCKED AROMATIC SULFONIC ACID

BACKGROUND OF THE INVENTION

This invention is related to blocked organic acids used as a catalyst in coating compositions and in particular to amino methyl proponal blocked aromatic sulfonic acids.

The use of aromatic sulfonic acids as catalysts for thermosetting coating compositions containing amino resin crosslinking agents such as melamine formaldehyde resins, alkylated melamine formaldehyde resins or urea formaldehyde resins are well known in the art as shown in Gallacher U.S. Pat. Nos. 4,075,176 issued Feb. 21, 1978 and in Gallacher 4,083,830. The application "pot life" i.e., the time during which the coating can be applied, for example by spraying, of such coating compositions containing aromatic sulfonic acids catalysts was relatively short. To increase pot life, blocked aromatic sulfonic acid catalysts were developed using an oxa-azacyclopetane compound as shown in Calbo U.S. Pat. Nos. 4,200,729 issued Apr. 29, 1980 and in Calbo 4,251,665, issued Feb. 17, 1981. These blocked catalyst unblocked during baking of the coating thereby providing free acid which catalyzes the curing reaction.

These blocked aromatic sulfonic acid catalysts are not as stable as desired by the automotive paint industry and are relatively expensive. There is a need for a blocked aromatic acid catalyst that is inexpensive and is stable for extended periods of time in storage and in the coating composition to which it has been added.

SUMMARY OF THE INVENTION

A blocked acid catalyst comprising an aromatic sulfonic acid blocked with amino methyl propanol and coating compositions containing the blocked acid catalyst.

DETAILED DESCRIPTION OF THE INVENTION

The blocked acid catalyst can be used in a wide variety of high solid coating compositions. The catalyst is stable for extended periods of time, is relatively inexpensive and is efficient. Typical high solid coating compositions in which the catalyst can be used have as the film forming binder the following constituents: acrylic polymers with reactive groups such as hydroxyl, carboxyl, glycidyl, amide groups or a mixture of these groups, polyester or alkyd resins having the aforementioned reactive groups or mixtures of these acrylic and polyester or alkyd resins and contain amino crosslinking agent, epoxy crosslinking agents or polyisocyanate cross linking agents. Typical amino crosslinking agents are melamine formaldehyde agents, alkylated melamine formaldehyde agents such as methylated melamine formaldehyde resins, methylated butylated melamine formaldehyde resins hexamethoxy melamine formaldehyde and the like.

The high solids coating compositions in which the blocked acid catalyst is used contain about 40–85% by weight of a film forming binder and about 15–60% by weight of a carrier for the binder which may be a solvent for the binder or in the case of a dispersion a combination of a nonsolvent and solvent for the binder. About 0.1–6.0% by weight of the blocked acid catalyst is used in the coating composition.

The blocked acid catalyst is added to the coating composition and after application to a substrate, usually by spray application, the coated substrate is baked and the blocked acid catalyst unblocks thereby providing acid groups which catalyzes the reaction between the cross linking agent and the acrylic, polyester or alkyd polymer having reactive groups. Typical baking temperatures which are used and that unblock the acid catalyst are about 100° to 150° C.

The blocked acid catalyst is formed by reacting all of the acid groups of an aromatic sulfonic acid with amino methyl propanol. Typical aromatic sulfonic acids that can be used can have a single aromatic ring or such a benzene derivatives or a diaromatic ring such as naphthalene derivatives. Typical alkyl aromatic sulfonic acids that are useful are as follows: para toluene sulfonic acid, dodecyl benzene sulfonic acid, decyl benzene sulfonic acid. Dodecyl benzene sulfonic is preferred for forming high quality finishes. The preferred amino methyl propanol is 2-amino-2-methyl-1-propanol.

The blocked acid catalyst is prepared by blending together equal molar amounts of the aromatic sulfonic acid and the amino methyl propanol preferably in a solvent such as an alkanol such as methanol and reacting for about 5–60 minutes at about 40°–70° C. The reaction is exothermic. The amino methyl propanol is added in small increments or added very slowly to achieve the above molar ratio while maintaining the temperature within the above range.

Typical coating compositions that utilize the blocked acid catalyst have as the film forming binder an acrylic polymer having carboxyl, hydroxyl, amide, glycidyl groups or mixtures thereof and a number average molecular weight of about 500–30,000 and an alkylated melamine crosslinking agent. The film forming binder generally contains about 40–90% by weight of the acylic polymer and 10–60% of the crosslinking agent.

Typically useful acrylic polymers contain alkyl methacrylate, alkyl acrylate, hydroxy alkyl acrylate, hydroxy alkyl methacrylate and can contain styrene, acrylic acid or methacrylic acid. Amide monomers such as methacrylamide and acrylamide can be used, glycidyl monomers such as glycidyl acrylate or glycidyl methacrylate can also be used.

Preferred acrylic polymers are of an alkyl methacrylate that has 1–18 carbon atoms in the alkyl group, an alkyl acrylate that has 2–18 carbon atoms in the alkyl group and a hydroxy alkyl acrylate or a hydroxy alkyl methacrylate each having 2–4 carbon atoms in the alkyl group. To form an acrylic polymer which has a hydroxyl content of about 2–10% by weight, a sufficient amount of the aforementioned hydroxy alkyl acrylate or methacrylate is utilized. The polymer also can contain small amounts of ethylenically unsaturated carboxylic acid, such as acrylic acid, methacrylate acid, itaconic acid, in amounts of about 0.1–5% by weight.

Typical alkyl methacrylates and acrylates that can be used to prepare the acrylic polymers are: methyl methacrylate, ethyl methacrylate, butyl methacrylate, hexyl methacrylate, 2-ethylhexyl methacrylate, nonyl methacrylate, lauryl methacrylate, stearyl methacrylate, cyclohexyl methacrylate, isodecyl methacrylate, propyl methacrylate, phenyl methacrylate, isobornyl methacrylate, ethyl acrylate, propyl acrylate, isopropyl acrylate, butyl acrylate, isobutyl acrylate, hexyl acrylate, 2-ethylhexyl acrylate, nonyl acrylate, lauryl acrylate, stearyl acrylate, cyclohexyl acrylate, isodecyl acrylate, phenyl acrylate, isobornyl acrylate and the like.

Adhesion promoting monomers can also be used in the acrylic polymers such as diethyl aminoethyl methacrylate, tertiary butyl aminoethyl methacrylate, 3-(2-methacryloxy ethyl)-2,2-spiro cyclohexyl oxazolidene and the like.

Typical hydroxy alkyl acrylates and methacryles which can be used to prepare the acrylic polymers are: 2-hydroxy ethyl acrylate, 2-hydroxy propyl acrylate, 2-hydroxy butyl acrylate, 2-hydroxy ethyl methacrylate, 2-hydroxy propyl methacrylate, 2-hydroxy butyl methacrylate, and the like.

The acrylic polymers can contain about 0.1–30% by weight of other constituents such as acrylonitrile, methacrylonitrile, acrylamide and methacrylamide, styrene or substituted styrene such as methyl styrene.

Useful acrylic polymers contain about 15–82% by weight of an alkyl methacrylate that has 1–4 carbon atoms in the alkyl group, preferably methyl methacrylate, 2–50% by weight of an alkyl acrylate that has 2–12 carbon atoms in the alkyl group and 16–35% by weight of a hydroxyl alkyl acrylate or a hydroxyl alkyl methacrylate each having 2–4 carbon atoms in the alkyl group. These polymers can contain up to 35% by weight of styrene which replaces a portion of the alkyl methacrylate. Also these polymers can contain an ethylenically unsaturated carboxylic acid.

Particularly useful acrylic polymers contain about 20–30% by weight styrene, 10–20% by weight methyl methacrylate, 35–45% by weight butyl acrylate, 20–30% by weight hydroxyl ethyl acrylate and 0.1–5% by weight of acrylic acid and have a number average molecular weight of 1,500–10,000.

The alkylated melamine formaldehyde crosslinking agent used generally has 1–4 carbon atoms in the alkyl group. The resin is prepared by conventional techniques in which an alcohol such as methanol, ethanol, propanol, isopropanol, butanol, isobutanol, tertiary butanol and the like is reacted with a melamine formaldehyde resin. The resin can be monomeric or polymeric. Preferred resins which give a high quality finish are fully alkylated melamine formaldehyde resins such as hexamethoxymethyl melamine and methoxy/butoxymethyl melamine.

The coating compositions can contain pigments. These pigments can be introduced into the composition by first forming a mill base with the acrylic polymer utilized in the composition or with other compatible polymers or polymeric dispersants by conventional techniques, such as sand-grinding, ball milling, attritor grinding, two roll milling to disperse the pigments. The mill base is blended with the film-forming constituents as shown in the following Examples.

Any of the conventional pigments used in the coating compositions can be utilized in this composition such as the following: metallic oxides, such as titanium dioxide, zinc oxide, iron oxide and the like, metal hydroxide, metal flakes such as aluminum flake, chromates, such as lead chromate, sulfides, sulfates, carbonates, carbon black, silica, talc, china clay, phthalocyanine blues and greens, organo reds, organo maroons and other organic dyes.

Metallic flake pigments such as aluminum flakes can be used alone or with the aforementioned pigments in the coating compositions. Generally, about 0.1–5% by weight, based on the weight of the binder, of these metallic flake pigments are used.

To improve weatherability of finishes of the coating compositions, about 0.1–10%, by weight, based on the weight of the binder, of an ultraviolet light stabilizer or a combination of ultraviolet light stabilizers can be added. Also, about 0.1–5% by weight, based on the weight of the binder, of an antioxidant can be added. Weatherability of finishes of coating compositions containing aluminum flake are particularly enhanced by the addition of ultraviolet light stabilizers and antioxidants. Also, about 0.1–10% by weight, based on the binder, of iron pyrophospate can be added with ultraviolet light stabilizers and antioxidants to improve weatherability of finishes. Typically useful ultraviolet light stabilizers and antioxidants are disclosed hereinafter.

The coating composition containing the additive of this invention can be applied over a variety of substrates, such as metal, glass, plastics, and the like, by any of the conventional application methods, such as spraying, electrostatic spraying, dipping, brushing, flowcoating and the like. The viscosity of the composition can be adjusted for any of these methods by adding solvents if necessary. Generally, the composition is utilized at a high solids content which keeps air pollution at a minimum level.

After application to a substrate, the resulting coatings are baked at relatively low temperatures of about 125° C. and above for about 15 minutes to 2 hours. The resulting finish is about 0.1–5.0 mils thick but for most uses, a 1–3 mil thick finish is used. One technique that is used to insure that there will be no popping or cratering of the finish is to allow the solvents to flash off for about 15–30 seconds before a second coating is sprayed on or otherwise applied, then waiting from about 2–10 minutes before baking the coating to allow any residual solvents to flash off. The resulting finish has good gloss and can be rubbed or polished with conventional techniques to improve the smoothness, appearance and gloss. The finish has good adhesion to substrates of all types, is hard and resistant to weathering solvents, alkali, scratches and the like. These characteristics make the composition particularly useful as a finish for automobiles, trucks, airplanes, railroad equipment, machines, outdoor equipment and the like.

Another aspect of this invention is to utilize the coating compositions containing the additive as a clear coat/color coat finish for substrates. In this finish, a clear coat top layer is in firm adherence to a color coat layer that is in adherence with a substrate. The clear coat is a transparent film of the coating composition and the color coat is the coating composition containing pigments in a pigment to binder ratio of about 1/100 to 150/100 and other additives.

Optionally, the color coat can contain about 0.1–10% by weight, based on the weight of the binder of the color coat, of an ultraviolet light stabilizer. Another option is that the color coat and the clear coat each can contain about 0.1–10% by weight, based on the weight of the binder of the coat, of an ultraviolet light stabilizer. Also, the clear coat or the color coat can contain about 0.1–5% by weight, based on the weight of the binder of the coat, of an antioxidant. When an antioxidant is used, the ratio of ultraviolet light stabilizer to antioxidant is about 1:1 to about 50:1.

Preferred, to form a durable finish, both the clear coat and the color coat contain about 5–8% by weight of an ultraviolet light stabilizer and optionally, about 0.1–1% by weight of the antioxidant and the ratio of ultraviolet light stabilizer to antioxidant is about 10:1.

The thickness of the fully cured color coat and clear coat can vary. Generally, the color coat is about 0.4–1.5 mils thick. Any of the aforementioned conventional pigments can be used in the color coat including metallic flake pigments can be used. The clear coat can also contain pigments having the same transparent refractive index as the binder of the clear coat and are of a small particle size of about 0.015–50 microns. Typical pigments that can be used in a pigment to binder weight ratio of about 1/100 to 10/100 of silica pigments. These pigments have a refractive index of about 1.4–1.6.

Typical ultraviolet light stabilizers that are useful are as follows:

Benzophenones such as hydroxy dodecyloxy benzophenone, 2,4-dihydroxybenzophenone, hydroxybenzophenones containing sulfonic groups and the like.

Triazines such as 2-phenyl-4-(2',4'-dihydroxylbenxoyl)-triazoles,2-[hydroxy-3',5'-(1,1-dimethylpropyl)-phenyl]benzotriazole, substituted benzotriazoles such as hydroxy-phenyltriazoles and the like.

Triazines such as 3,5-dialkyl-4-hdyroxyphenyl derivatives of triazine, sulfur containing derivatives of diallyl-4-hydroxy phenyl triazines, hydroxy phenyl-1,3,5-triazine and the like.

Benzoates such as dibenzoate of diphenylol propane, tertiary butyl benzoate of diphenylol propane, and the like.

Other ultraviolet light stabilizers that can be used include lower alkyl thiomethylene containing phenols, substituted benzenes such as 1,3-bis-(2'-hydroxybenzoyl) benzene, metal derivatives of 3,5-di-t-butyl-4-hydroxy phenyl propionic acid, asymmetrical oxalic acid diarylamides, alkylhydroxy-phenyl-thioalkanoic acid ester and the like.

Particularly useful ultraviolet light stabilizers that can be used are hindered amines of bipiperidyl derivatives such as those in Murayama et al., U.S. Pat. No. 4,061,616, issued Dec. 6, 1977.

Typical antioxidants that are useful are as follows: tetrakis alkylene (di-alkyl hydroxy aryl)alkyl ester alkanes such as tetrakis methylene 3(3',5'-dibutyl-4'-hdyroxyphenyl)propionate methane, reaction product of p-amino diphenylamine and glycidyl methacrylate, reaction product of n-hexyl-N'-phenyl-p-phenylene diamine and glycidyl methacrylate, pentaerythritol tetrakis(thioglycolate), trimethylol propane tris(thioglycolate), trimethylol ethane tris(thioglycoate), N-(4-anilino phenyl) acrylamide and the like.

One preferred combination of ultraviolet light stabilizer and antioxidant is 2-hydroxy-4-dodecyloxy benzophenone or a substituted 2(2-hydroxyphenyl) benzotriazole and tetrakis methylene 3(3',5'-dibutyl-4'-hydroxyphenyl) propionate methane.

The clear coat/color coat finish is applied by conventional spraying techniques and preferably the clear coat is applied to the color coat while the color coat is still wet. Other conventional application techniques can be used such as brushing, roller coating, electrostatic spraying and the like. The finish is then dried at ambient temperatures or can be used as indicated above.

The following examples illustrate the invention. All parts and percentages are on a weight basis unless otherwise indicated. Molecular weights are determined by gel permeation chromatography using polymethyl methacrylate as the standard.

The following abbreviations are used in the examples:
S—styrene,
MMA—methyl methacrylate,
NBA—n-butyl acrylate,
HEA—hydroxy ethyl acrylate,
AA—acrylic acid.

EXAMPLE

A blocked acid catalyst solution (DDBSA/AMP Solution) was prepared by charging the following constituents into a reactor equipped with a stirrer and a water cooling jacket:

|  | Parts by Weight |
|---|---|
| Portion 1 | |
| Methanol | 221.69 |
| Dodecyl benzene sulfonic acid solution (70% solution in iso-proponal) | 376.15 |
| Methanol | 37.60 |
| Portion 2 | |
| 2-amino-2-methyl-1-propanol | 19.74 |
| Portion 3 | |
| 2-amino-2-methyl-1-propanol | 19.74 |
| Portion 4 | |
| 2-amino-2-methyl-1-propanol | 19.74 |
| Portion 5 | |
| 2-amino-2-methyl-1-propanol | 19.74 |
| Methanol | 37.60 |
| Total | 752.00 |

Portion 1 was charged into the reactor and mixed for 20 minutes. Portion 2 was added with mixing and the temperature was maintained at 50° C. and mixing was continued for 20 minutes. Portion 3 was added and mixed for 20 minutes while maintaining the temperature at 50° C. Portion 4 was added and mixed for 20 minutes while maintaining the temperature at 50° C. Portion 5 was added and mixed for 1 hour while the temperature was maintained at 50° C.

The resulting solution has a solids content of about 45% of amino methyl proponal blocked dodecyl sulfonic acid.

A coating composition was prepared by blending together the following constituents:

|  | Parts by Weight |
|---|---|
| "Resimine" X-755 (monomeric fully alkylated melamine formaldehyde cross linking agent) | 76.36 |
| Silica dispersion (12.43 parts "Cab-O-Sil" M5 silica pigment, 57.70 parts "Cellosolve" acetate and 69.01 parts "Resimine" X-755) | 139.14 |
| Acrylic resin solution (60% solution of an acrylic polymer of S/MMA/BA/HEA/AA in a ratio of 30/18.5/40/10/1.5 in a mixture of hydrocarbon solvents) | 104.10 |
| Iron pyrophosphate dispersion (27.75 parts of an acrylic polymer 2 of S/MMA/BA/HEA/AA in a ratio of 15/14.8/40/30/0.2, 6.93 parts methyl amyl ketone and 6.16 parts iron pyrophosphate) | 27.75 |
| Acrylic polymer dispersion (150.95 parts of an acrylic polymer 2 described above and methyl amyl ketone) | 201.27 |
| "Tinuvin" 328 Ultraviolet light absorber (substituted benzotriazol) | 8.30 |
| "Irganox" 1010 Antioxidant | 0.43 |
| Xylene | 77.57 |
| "Irgastab" 2002 Light stabilizer | 4.17 |
| Butanol | 11.14 |
| Methyl amyl ketone | 73.72 |
| "Monastral" Blue mill base | 4.73 |

-continued

| | Parts by Weight |
|---|---|
| (1.62 parts acrylic dispersing resin, 2.73 parts butyl acetate and 0.38 parts phthalocyanine blue pigment) | |
| Indathrone Blue mill base | 17.69 |
| (8.84 parts acrylic dispersing resin, 7.61 parts of butyl acetate and 1.24 parts indathrone blue lake) | |
| Aluminum Flake mill base | 57.52 |
| (40.19 parts acrylic dispersing resin, 12.77 parts aluminum paste, 2.61 parts butyl acetate and 1.95 parts isopropanol) | |
| Total | 803.89 |

The following blocked acid catalyst solutions were prepared by blendig together the following constituents:

| PTSA/AMP Solution | |
|---|---|
| 2-Amino-2-methyl-1-propanol | 2.45 |
| Methanol | 10.45 |
| Para toluene sulfonic acid solution | 11.50 |
| (17.8% solids in methanol) | |
| Total | 24.40 |
| PTSA/MDEA Solution | |
| Methyl diethanol amine | 3.10 |
| Methanol | 9.80 |
| Para toluene sulfonic acid solution | 11.50 |
| (17.8% solids in methanol) | |
| Total | 24.40 |
| PTSA/EDEA Solution | |
| Ethyl diethanol amine | 3.28 |
| Methanol | 9.62 |
| Para toluene sulfonic acid solution | 11.50 |
| (17.8% solids in methanol) | |
| Total | 24.40 |
| PTSA/DMO Solution | |
| Dimethyl oxazolidine solution | 12.90 |
| (25% solids in methanol) | |
| Para toluene sulfonic acid solution | 11.50 |
| (17.8% solids in methanol) | |
| Total | 24.40 |

Five separate coating compositions were prepared and each were made with.the above identical coating composition formula. To each of the coating compositions one of the above prepared blocked catalyst solutions was added and thoroughly mixed with the coating composition. To the fifth composition the same proportion as used above of DDBSA/AMP solution was added and mixed with the coating composition. Each coating composition was sprayed onto separate phosphated steel panel primed with an electrodeposition primer ED-3002 and dried for 10 minutes at room temperature and baked for 30 minutes at about 120° C. to form a dried and cured finish. The film thickness, gloss at 20° and knoop hardness was measured and the results are as follows:

| Paint | Catalyst | Film Thickness (mils) | Gloss 20° | Hardness (knoops) |
|---|---|---|---|---|
| A | PTSA/AMP | 1.3 | 69 | 5.0 |
| B | PTSA/MDEA | 1.2 | 68 | Sticky |
| C | PTSA/EDEA | 1.2 | 68 | Soft |
| D | PTSA/DMO | 1.6 | 67 | 4.7 |
| E | DDBSA/AMP | 1.5 | 68 | 5.0 |

The above data shows that acid catalyst blocked with AMP (2-amino-2-methyl-1-propanol) formed finishes that have acceptable gloss and hardness in comparison to acid catalysts that are blocked with conventional amine blocking agents such as methyl diethanol amine and ethyl diethanol amine. The AMP blocked catalyst gives slightly better results than the dimethyl oxazoliaine blocked catalyst which is more expensive and not as stable as the AMP blocked catalyst.

We claim:

1. A coating composition comprising about 40-85% by weight of a film forming binder and about 15-60% by weight of an organic liquid carrier and containing in addition about 0.1-6.0% by weight of a curing catalyst consisting essentially of an adduct of an aromatic sulfonic acid reacted with 2-amino-2-methyl-1-propanol and wherein the film forming binder comprises sabout 40-90% by weight, based on the weight of the binder, of an acrylic polymer containing reactive hydroxyl, glycidyl, amide groups or mixtures of these groups and about 10-60% by weight of an amino resin crosslinking agent.

2. The coating composition of claim 1 in which the acrylic polymer consists essentially of an alkyl methacrylate, an alkyl acrylate and a hydroxy alkyl acrylate or methacrylate and the amino resin crosslinking resin consists essentially of an alkylated melamine formaldehyde crosslinking agent.

3. The coating composition of claim 1 in which the aromatic sulfonic acid is alkyl aromatic sulfonic acid.

4. The coating composition of claim 3 in which the alkyl aromatic sulfonic acid is para toluene sulfonic acid.

5. The coating composition of claim 3 in which the alkyl aromatic sulfonic acid is dodecyl benzene sulfonic acid.

* * * * *